US012434669B2

(12) United States Patent
Raju et al.

(10) Patent No.: US 12,434,669 B2
(45) Date of Patent: Oct. 7, 2025

(54) VEHICLE CAMERA LENS CLEANING SYSTEM WITH SWIRL FLOW GENERATOR

(71) Applicant: GM GLOBAL TECHNOLOGY OPERATIONS LLC, Detroit, MI (US)

(72) Inventors: Kothamasi Sumithra Raju, Bengaluru (IN); Yuchuan Liu, Troy, MI (US); Julien P. Mourou, Bloomfield Hills, MI (US); Zhe Li, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/501,133

(22) Filed: Nov. 3, 2023

(65) Prior Publication Data

US 2025/0145118 A1  May 8, 2025

(51) Int. Cl.
*B60S 1/56* (2006.01)
*B08B 5/02* (2006.01)
*B08B 7/02* (2006.01)
*B60S 1/54* (2006.01)

(52) U.S. Cl.
CPC . *B60S 1/56* (2013.01); *B60S 1/54* (2013.01); *B08B 5/02* (2013.01); *B08B 7/028* (2013.01)

(58) Field of Classification Search
CPC ..... B60S 1/02; B60S 1/54; B60S 1/56; G02B 27/0006; G01S 2007/4977
See application file for complete search history.

(56) References Cited

U.S. PATENT DOCUMENTS

| 2011/0073142 | A1* | 3/2011 | Hattori | B60S 1/481 134/198 |
| 2014/0104426 | A1* | 4/2014 | Boegel | B60R 11/04 348/148 |
| 2019/0106085 | A1* | 4/2019 | Bacchus | G02B 27/0006 |
| 2020/0223401 | A1* | 7/2020 | Little | B60S 1/56 |
| 2022/0193735 | A1  | 6/2022 | Kishi | |
| 2023/0004072 | A1  | 1/2023 | Ishii et al. | |

FOREIGN PATENT DOCUMENTS

| DE | 1497581 A1 * | 4/1969 |
| DE | 102014213283 A1 * | 1/2016 |
| GB | 2620007 A | 12/2023 |
| WO | WO03104052 A1 * | 12/2003 |

OTHER PUBLICATIONS

German Office Action from counterpart DE102023136834.6, dated Oct. 15, 2024.

* cited by examiner

*Primary Examiner* — Kaj K Olsen
*Assistant Examiner* — Richard Z. Zhang

(57) ABSTRACT

A vehicle camera lens cleaning system includes a camera configured to be mounted to a vehicle and including a lens; an ultrasonic cleaning system adapted to vibrate the lens; a source of pressurized air; an air flow passage connected to the source of pressurize air; an annular duct connected to the air flow passage and surrounding the lens, the annular duct having a non-uniform cross section taken in a radial direction from a center of the lens; a plurality of nozzles extending from the annular duct and pointed at the lens; and a controller configured to supply pressurized air from the source of pressurized air to the plurality of nozzles simultaneous with operating the ultrasonic cleaning system.

14 Claims, 2 Drawing Sheets

VEHICLE CAMERA LENS CLEANING SYSTEM WITH SWIRL FLOW GENERATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a system and method for cleaning a lens of a camera of an autonomous vehicle or other vehicle camera system.

SUMMARY

Autonomous vehicles and other vehicles can be supplied with cameras for guiding the vehicle or vehicle operator to maneuver the vehicle and avoid potential obstacles during driving and parking of the vehicle. During operation, water and dirt can get on the camera lens and may need to be removed to allow proper operation of the camera guidance system. It has been known to use ultrasonic vibration of the camera lens to clean the lens and evaporate the water droplets. When the vehicle is being driven, the aero flow over the lens can cause the evaporated water droplets to be spread over the camera lens. The present disclosure provides a swirl flow generator to prevent the accumulation of the evaporated water droplets on the camera lens.

According to an aspect of the present disclosure, a vehicle camera lens cleaning system includes a camera configured to be mounted to a vehicle, the camera including a lens. A source of pressurized air is connected to an air flow passage. An annular duct is connected to the air flow passage and surrounding the lens. The annular duct includes a non-uniform cross section taken in a radial direction from a center of the lens. A plurality of nozzles extend from the annular duct and are pointed at the lens.

According to a further aspect, the annular duct includes a region of maximum width and regions of reduced width that are smaller than the region of maximum width.

According to a further aspect, the plurality of nozzles include at least some of the plurality of nozzles having a flow path area different from a flow path area of others of the plurality of nozzles.

According to a further aspect, the plurality of nozzles include at least some of the plurality of nozzles having a discharge angle different from a discharge angle of others of the plurality of nozzles.

According to a further aspect, the plurality of nozzles direct an airflow radially inward from the annular duct.

According to a further aspect, the source of pressurized air includes an air compressor.

According to another aspect, the vehicle camera lens cleaning system includes a camera configured to be mounted to a vehicle and including a lens; an ultrasonic cleaning system adapted to vibrate the lens; a source of pressurized air; an air flow passage connected to the source of pressurize air; an annular duct connected to the air flow passage and surrounding the lens, the annular duct having a non-uniform cross section taken in a radial direction from a center of the lens; a plurality of nozzles extending from the annular duct and pointed at the lens; and a controller configured to supply pressurized air from the source of pressurized air to the plurality of nozzles simultaneous with operating the ultrasonic cleaning system.

According to another aspect, a method of cleaning a vehicle camera lens includes ultrasonically vibrating the camera lens and directing a swirl flow of pressurized air in front of the camera lens.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
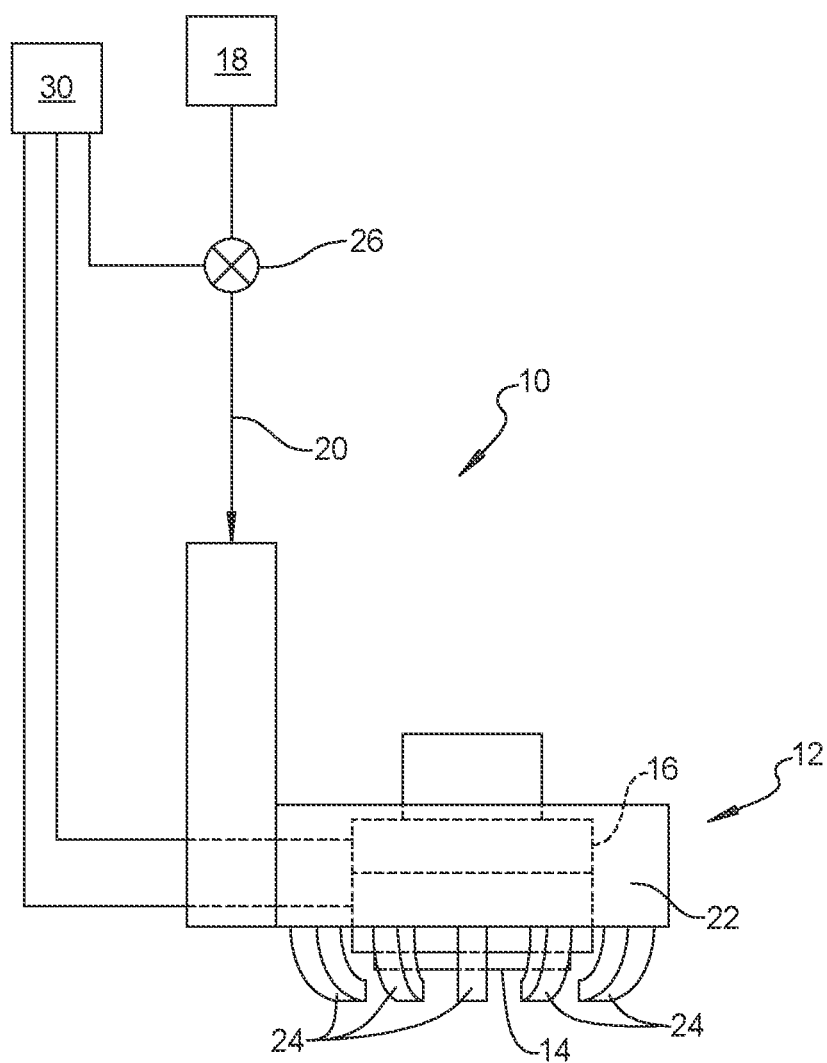
FIG. 1 is a schematic view of a vehicle camera lens cleaning system according to the principles of the present disclosure.
Figure 3:
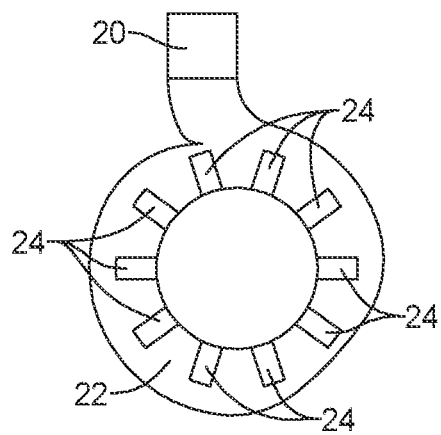
FIG. 3 is a plan view of the plurality of nozzles extending from the annular duct.

With reference to FIG. 1, a vehicle camera lens cleaning system 10 according to the principles of the present disclosure will now be described. The vehicle camera lens cleaning system 10 includes a camera 12 with a lens 14. The camera 12 includes an ultrasonic mechanism 16 configured to ultrasonically vibrate the lens 14 of the camera 12 for cleaning the lens 14. A source of pressurized air 18 is provided in connection with an air flow passage 20 that is connected to an annular duct 22 that surrounds the lens 14 and includes a plurality of nozzles 24 (best shown in FIGS. 1, 3 and 4) that are directed at the lens 14. The pressurized air source 18 can include a compressor and/or a storage tank.

Figure 2:
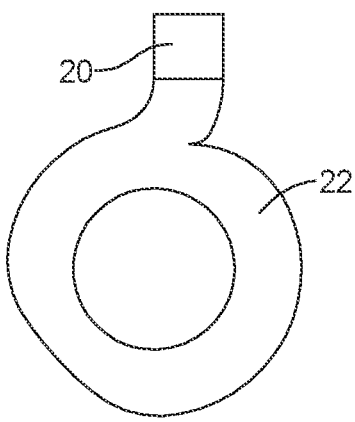
FIG. 2 is a top plan view of an exemplary annular duct of the vehicle camera lens cleaning system.
Figure 4:
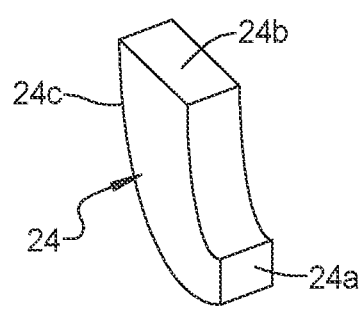
FIG. 4 is a perspective view of an exemplary nozzle according to the principles of the present disclosure.

As best shown in FIG. 2, the annular duct 22 has a variable cross-section so that there are increases in cross section and decreases in cross section at differing circumferential locations around the annular duct 22. The variable cross-section of the annular duct 22 and the plurality of nozzles 24 are configured to create a swirl flow in front of the camera lens 14. With reference to FIG. 4, an outlet 24*a* and/or inlet 24*b* of the plurality of nozzles 24 can be differently sized and angularly arranged to cause a swirl flow in front of the lens 14. The nozzles 24 include an inwardly curved body 24*c* defining a channel extending from the inlet 24*b* to the outlet 24*a*.

The air flow passage 20 or the source of pressurized air 18 can be provided with a flow control valve 26. A control unit 30 can be configured to control operation of the ultrasonic mechanism 16 and opening of the flow control valve 26. The operation of the ultrasonic mechanism 16 dislodges debris from the lens 14 and causes any water on the lens 14 to evaporate. The swirl flow of pressurized air in front of the lens 14 created by the annular duct 22 and nozzles 24 cause the evaporated liquid to dissipate without accumulating on the lens 14. Accordingly, the control unit 30 simultaneously activates the ultrasonic mechanism 16 and the flow control valve 26 for a predetermined period of time (for example, 2 to 5 seconds) sufficient to clean the lens 14 and dissipate any evaporated fluid from in front of the lens 14.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle camera lens cleaning system, comprising:
   a camera configured to be mounted to a vehicle, the camera including a lens;
   a source of pressurized air;
   an air flow passage connected to the source of pressurize air;
   an annular duct connected to the air flow passage and surrounding the lens, the annular duct having a non-uniform cross section taken in a radial direction from a center axis perpendicular to a plane of the lens; and
   a plurality of nozzles each extending from the annular duct in a direction parallel to the center axis of the lens and curving radially inward with an outlet opening pointed at the lens and at the center axis.

2. The vehicle camera lens cleaning system according to claim 1, wherein the annular duct includes a region of maximum width and regions of reduced width that are smaller than the region of maximum width.

3. The vehicle camera lens cleaning system according to claim 1, wherein the plurality of nozzles include at least some of the plurality of nozzles having a flow path area different from a flow path area of others of the plurality of nozzles.

4. The vehicle camera lens cleaning system according to claim 1, wherein the plurality of nozzles include at least some of the plurality of nozzles having a discharge angle different from a discharge angle of others of the plurality of nozzles.

5. The vehicle camera lens cleaning system according to claim 1, wherein the plurality of nozzles direct an airflow radially inward from the annular duct.

6. The vehicle camera lens cleaning system according to claim 1, wherein the source of pressurized air includes an air compressor.

7. The vehicle camera lens cleaning system according to claim 1, wherein each of the plurality of nozzles decreases in cross section from the annular duct to the outlet opening.

8. A vehicle camera lens cleaning system, comprising:
   a camera configured to be mounted to a vehicle and including a lens;
   an ultrasonic transducer mounted to the camera and configured to ultrasonically vibrate the lens;
   a source of pressurized air;
   an air flow passage connected to the source of pressurize air;
   an annular duct connected to the air flow passage and surrounding the lens, the annular duct having a non-uniform cross section taken in a radial direction from a center axis perpendicular to a plane of the lens;
   a plurality of nozzles each extending from the annular duct in a direction parallel to the center axis of the lens and curving radially inward with an outlet opening pointed at the lens and at the center axis; and
   a controller configured to supply pressurized air from the source of pressurized air to the plurality of nozzles simultaneous with operating the ultrasonic transducer.

9. The vehicle camera lens cleaning system according to claim 8, wherein the annular duct includes a region of maximum width and regions of reduced width that are smaller than the region of maximum width.

10. The vehicle camera lens cleaning system according to claim 8, wherein the plurality of nozzles include at least some of the plurality of nozzles having a flow path area different from a flow path area of others of the plurality of nozzles.

11. The vehicle camera lens cleaning system according to claim 8, wherein the plurality of nozzles include at least some of the plurality of nozzles having a discharge angle different from a discharge angle of others of the plurality of nozzles.

12. The vehicle camera lens cleaning system according to claim 8, wherein the plurality of nozzles direct an airflow radially inward from the annular duct.

13. The vehicle camera lens cleaning system according to claim 8, wherein the source of pressurized air includes an air compressor.

14. The vehicle camera lens cleaning system according to claim 8, wherein each of the plurality of nozzles decreases in cross section from the annular duct to the outlet opening.

* * * * *